US012696022B2

(12) United States Patent
Jepsen

(10) Patent No.: US 12,696,022 B2
(45) Date of Patent: Jul. 28, 2026

(54) LIGHT GUIDE MOUNTING FOR AUDIO SPEAKER ILLUMINATION

(71) Applicant: HARMAN INTERNATIONAL INDUSTRIES, INCORPORATED, Stamford, CT (US)

(72) Inventor: Henrik Kirkeby Jepsen, Vinderup (DK)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 19/336,706

(22) Filed: Sep. 23, 2025

(65) Prior Publication Data

US 2026/0089416 A1 Mar. 26, 2026

(30) Foreign Application Priority Data

Sep. 24, 2024 (EP) .................................... 24202254

(51) Int. Cl.
*H04R 1/02* (2006.01)
*F21V 33/00* (2006.01)

(52) U.S. Cl.
CPC ......... *H04R 1/028* (2013.01); *F21V 33/0056* (2013.01); *F21V 2200/20* (2015.01)

(58) Field of Classification Search
CPC .. H04R 1/028; F21V 33/0056; F21V 2200/20
See application file for complete search history.

(56) References Cited

U.S. PATENT DOCUMENTS

| | | | | |
|---|---|---|---|---|
| 6,563,929 B2 * | 5/2003 | Kim | H04R 1/028 381/396 |
| 7,123,738 B1 * | 10/2006 | Mizone | H04R 1/028 381/406 |
| 9,628,916 B2 * | 4/2017 | Yuasa | B60R 11/0217 |
| 2010/0316247 A1 * | 12/2010 | Ding | G08B 7/066 381/397 |
| 2014/0192513 A1 * | 7/2014 | Yim | H04R 1/028 362/86 |
| 2024/0187769 A1 | 6/2024 | Jepsen et al. | |
| 2025/0106540 A1 * | 3/2025 | Ryu | F21V 33/0056 |

* cited by examiner

*Primary Examiner* — Matthew J. Peerce
(74) *Attorney, Agent, or Firm* — Artegis Law Group, LLP

(57) ABSTRACT

The present disclosure relates to a magnet assembly for an audio speaker. The magnet assembly comprises a magnet arrangement including a through hole and a light guide. The light guide is configured to guide light through the through hole of the magnet arrangement. The light guide includes a first portion having a cylindrical shape with a longitudinal axis. The first portion has a light receiving end surface for receiving light from a light source and is configured to be inserted in the direction of the longitudinal axis into the through hole of the magnet arrangement. The light guide includes a second portion for emitting the light received at the light receiving end surface. The light guide includes a first protrusion protruding perpendicular to the longitudinal axis from the lateral surface of the first portion.

20 Claims, 7 Drawing Sheets

LIGHT GUIDE MOUNTING FOR AUDIO SPEAKER ILLUMINATION

CROSS-REFERENCE TO RELATED APPLICATIONS

This application claims priority benefit to European Patent Application No. 24202254.9 filed Sep. 24, 2024, the contents of which are incorporated herein by reference in its entirety.

BACKGROUND

Field of the Various Embodiments

The present application relates to a magnet assembly for an audio speaker comprising a light guide, and in particular to a mounting of a light guide in a magnet assembly.

Description of the Related Art

Audio speakers (also referred to as loudspeakers, audio loudspeakers, or simply speakers) may involve the use of movable diaphragms driven by voice coils to generate and emit acoustic sound waves. This technology has been widely adopted in various applications, including home entertainment systems, public address systems, and vehicle audio systems. However, with the increasing demand for visually appealing audio devices, there is a growing need to integrate lighting into audio speakers without compromising their performance or increasing their size.

One approach to illuminating audio speakers is to use light sources located at or in the speaker itself. However, this approach poses significant challenges, particularly when it comes to space constraints and heat management. In environments where space is limited, such as in vehicles, adding a light source to an audio speaker can greatly increase its overall size, which may not be feasible. Furthermore, repeated heating of the light source can reduce its lifespan, necessitating careful consideration of its placement.

Despite these challenges, various solutions have been proposed to address the need for illuminated audio speakers. One such solution involves the use of light guides to distribute light from a remote light source to the speaker, for example illuminating the diaphragm. However, this approach may raise several problems. For instance, light guides can be a source of rattling sounds, which can negatively impact the overall acoustic performance of the speaker. Additionally, light guides can increase the cost and complexity of assembling and disassembling the speaker.

Accordingly, a need exists to provide a cost-effective fixation method for a light guide in a standard magnet assembly, ensuring that acoustic performance is not negatively impacted and no rattling sounds are created. The aim is to design an easy-to-mount fixation system that does not limit the light guide's efficiency or its ability to effectively mix colors, while also being sustainable and easily disassembled, thereby overcoming the above-mentioned problems at least in part.

SUMMARY

One aspect of the present disclosure relates to a magnet assembly for an audio speaker. The magnet assembly comprises a magnet arrangement including a through hole and a light guide. The light guide is configured to guide light through the through hole of the magnet arrangement. The light guide includes a first portion and a second portion. The first portion has a cylindrical shape with a longitudinal axis. The first portion has a light receiving end surface for receiving light from a light source. The first portion is configured to be inserted in the direction of the longitudinal axis into the through hole of the magnet arrangement. The second portion is configured to emit the light received at the light receiving end surface. The second portion is arranged at an end of the first portion opposite to the light receiving end surface. The light guide includes a first protrusion and at least one second protrusion. The first protrusion protrudes perpendicular to the longitudinal axis from the lateral surface of the first portion and provides a support structure for an edge of the through hole when the light guide is located in the through hole. The at least one second protrusion protrudes perpendicular to the longitudinal axis from the lateral surface of the first portion and is arranged, in the direction of the longitudinal axis, between the first protrusion and the light receiving end surface. The at least one second protrusion is dimensioned to provide an interference fit of the first portion within the through hole of the magnet arrangement.

One aspect of the present disclosure relates to an audio speaker. The audio speaker comprises a voice coil and a magnet assembly positioned within the voice coil. The magnet assembly may be the above magnet assembly. A movable diaphragm is connected to the voice coil and configured to move together with the voice coil. The movable diaphragm comprises, in a direction opposite the main sound emission direction, a front surface and a rear surface opposite the front surface. A light source is configured to emit light and is located at the light receiving end surface of the light guide. The second portion of the light guide extends in the main sound emission direction through the diaphragm.

It is to be understood that the features mentioned above and features yet to be explained below can be used not only in the respective combinations indicated, but also in other combinations or in isolation without departing from the scope of the present disclosure. Features of the above-mentioned aspects and embodiments described below may be combined with each other in other embodiments unless explicitly mentioned otherwise.

BRIEF DESCRIPTION OF THE DRAWINGS

Other devices, systems, methods, features and advantages of the disclosure will be or will become apparent to those skilled in the art upon examination of the following detailed description and figures. In particular, the features and effects of the application will become apparent from the following detailed description when read in conjunction with the accompanying drawings, in which like reference numerals refer to like elements.

DETAILED DESCRIPTION

Figure 1:
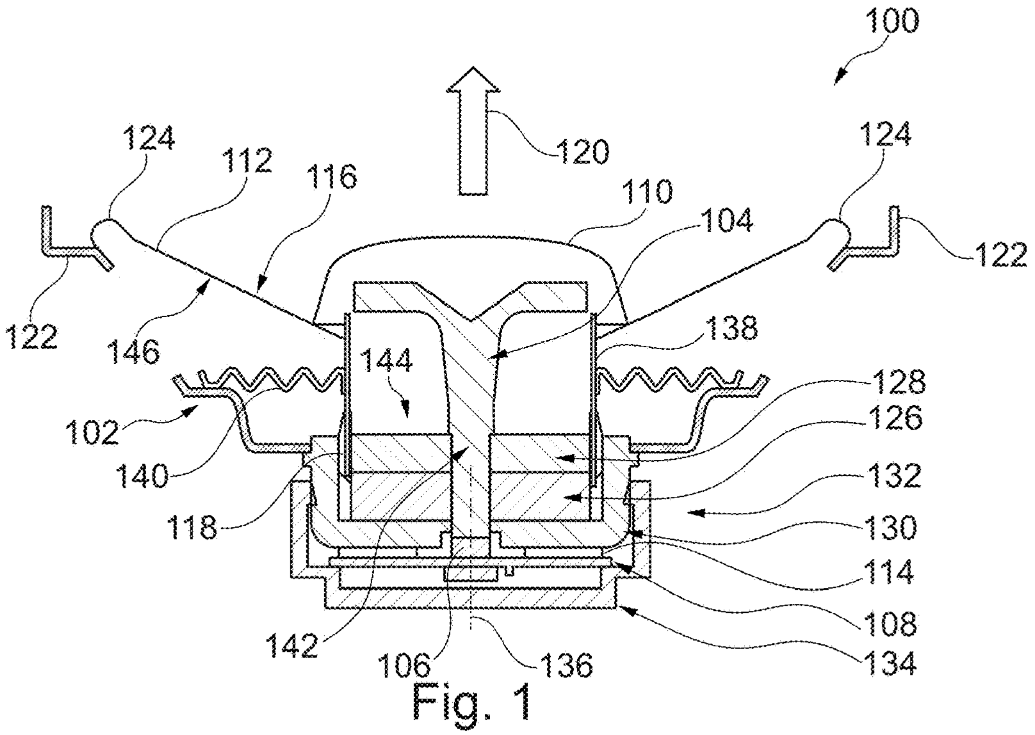
FIG. 1 shows a schematic cross-sectional view of an audio speaker which is illuminated by a light source according to one of a number of embodiments.

In the following, embodiments of the disclosure will be described in detail with reference to the accompanying drawings. It is to be understood that the following description of embodiments is not to be taken in a limiting sense. The scope of the disclosure is not intended to be limited by the embodiments described below or by the drawings, which are for illustrative purposes only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling.

In the present context the terms 'audio speaker' should be interpreted to mean a device that is capable of generating and emitting acoustic waves by actuating a movable diaphragm into a main sound emission direction. Thus, the audio speaker according to the present disclosure includes a movable diaphragm and a drive, e.g. a voice coil, arranged to actuate the movable diaphragm. During operation of the audio speaker, voice coil receives appropriate input signals and operates in response to the received input signals in such a manner that it causes the movable diaphragm to move or vibrate and thereby generate acoustic waves in accordance with the input signals.

One example of the present disclosure relates to a magnet assembly for an audio speaker. The magnet assembly comprises a magnet arrangement including a through hole and a light guide. The light guide is configured to guide light through the through hole of the magnet arrangement. The light guide includes a first portion and a second portion. The first portion has a cylindrical shape with a longitudinal axis. The first portion has a light receiving end surface for receiving light from a light source. The first portion is configured to be inserted in the direction of the longitudinal axis into the through hole of the magnet arrangement. The second portion is configured to emit the light received at the light receiving end surface. The second portion is arranged at an end of the first portion opposite to the light receiving end surface. The light guide includes a first protrusion and at least one second protrusion. The first protrusion protrudes perpendicular to the longitudinal axis from the lateral surface of the first portion and provides a support structure for an edge of the through hole when the light guide is located in the through hole. The at least one second protrusion protrudes perpendicular to the longitudinal axis from the lateral surface of the first portion and is arranged, in the direction of the longitudinal axis, between the first protrusion and the light receiving end surface. The at least one second protrusion is dimensioned to provide an interference fit of the first portion within the through hole of the magnet arrangement.

A cylindrical shape may be understood as a three-dimensional shape having a constant cross-section along its entire length. The cross-section may have any shape, for example circular, polygonal or elliptic. In particular, the cross-section may be circular. A longitudinal axis may be understood as an imaginary line running along the length of the cylindrical shape. For a circular cross-section, the longitudinal axis may be understood as the center of the cylindrical shape, around which the shape is symmetrical. The term "through hole" refers to an opening or aperture in the magnet arrangement that allows for the passage of the first portion. An interference fit may be understood as a tight fit between two parts, where one part is slightly larger than the other, requiring some force to assemble and disassemble.

An effect may be that the light guide can be mounted in a space-efficient manner within the hole of the magnet, without significantly affecting the performance of the magnet. No additional fixation means, such as screws or adhesives, are necessary, allowing for exact positioning and easy assembly and disassembly. The first and second protrusions do not essentially affect the light distribution in the light guide, providing a reliable and efficient lighting solution.

In an example, the second portion may include a conical or tapered portion arranged along the longitudinal axis and having a diameter that increases in a direction away from the first portion. A disc-shaped portion may be located at an end of the conical portion opposite the first portion.

For example, an audio speaker including the magnet assembly may be configured to emit sound in a main sound emission direction. The audio speaker may comprise a voice coil, a movable diaphragm connected to the voice coil and configured to move together with the voice coil. The movable diaphragm comprises in a direction opposite the main sound emission direction, a front or upper surface and a rear surface opposite the front surface. Furthermore, a light source may be provided configured to emit light, which is located in direction of the main sound emission direction, below the voice coil.

As a result of this arrangement, the light from the light source may be directed from the light receiving end surface at the rear of the audio speaker through the through hole to the front surface of the diaphragm. The conical or tapered portion in combination with the disc-shaped portion may deflect the light substantially perpendicular to the longitudinal axis to illuminate the front surface of the diaphragm. This is particularly useful when the audio speaker has a movable diaphragm with a front surface that is intended to be illuminated, for example through a hole in the diaphragm that is covered with a dust cap (sometimes also referred to as protective cap). The disc-shaped portion may be disposed below the dust cap so that it is essentially not visible from the front of the speaker. Transparent windows in side surfaces of the dust cap may allow radial emission of the light from the disc-shaped portion on the front side of the diaphragm. The deflected light provides a uniform illumination of the front surface of the diaphragm, enhancing the visual appeal of the audio speaker.

In some examples, dust cap may be completely transparent or at least a top surface of the dust cap may be transparent such that the light guide is visible. Light from the light guide may be visible more directly from a direction opposite the main sound emission direction. The mechanics become visible. In some examples, the second portion, in particular the disc-shaped portion may be configured to illuminate graphics or logos on the dust cap top surface.

In various examples, the first protrusion is formed by an edge of the conical portion facing the end of the first portion.

An edge may be understood as a boundary or border between two surfaces. In this context, the edge of the conical portion refers to the transition point where the conical shape meets the first portion. For example, at the transition between the first portion and the second portion, the conical second portion may have a larger diameter than the cylindrical first portion so that the first protrusion is formed by the end of the second portion. In further examples, a bulge may be provided at or near the transition between the first portion and the second portion. The bulge may be continuous in a circumferential direction or discontinuous, i.e. a plurality of short bulge sections may be provided along the circumference of the transition between the first and second portions.

This arrangement provides accurate positioning of the light guide with respect to the magnet arrangement. By forming the first protrusion from the edge of the conical portion, a precise and consistent location is established for the light guide, ensuring optimal alignment and performance. An effect may be that this precise positioning enables a tight fit between the light guide and the magnet assembly, reducing any potential gaps or misalignments that could compromise the efficiency of the light guiding system. This tight fit also helps to maintain the structural integrity of the assembly, providing a robust and reliable design.

In an example, the disc-shaped portion is arranged coaxially with the longitudinal axis. A lateral circumferential surface of the disc-shaped portion may be oblique with respect to the longitudinal axis by an angle of at least 10°, preferably 25°.

A lateral circumferential surface may be understood as the curved surface of the disc-shaped portion between outer edges of its upper and lower surfaces. The term "oblique" refers to the angular deviation between this surface and the longitudinal axis.

This arrangement enables homogenous illumination of the diaphragm. Due to its shape, the diaphragm is often referred to as a cone. By angling the lateral circumferential surface of the disc-shaped portion, light rays are refracted in a way that distributes them evenly across the diaphragm, eliminating hotspots or areas with reduced brightness. An effect may be that this uniform distribution of light results in a more balanced and aesthetically pleasing illumination of the diaphragm, creating an improved visual experience for users. The specified angle range (at least 10°, preferably 25°) ensures a sufficient deviation to achieve this homogenous illumination, while maintaining a stable and efficient optical performance when the diaphragm is moving during sound reproduction.

In various examples, the first portion of the light guide may have a cross-section perpendicular to the longitudinal axis that corresponds to a cross-section of the through hole of the magnet arrangement. A corresponding cross-section may be understood as having identical or very similar dimensions and shapes, allowing for precise alignment and fitting between the two components.

Such arrangement enables cost-effective fixation and easy mounting in usual magnet arrangements without affecting acoustic performance. By matching the cross-section of the first portion with that of the through hole, a precise fit is ensured, eliminating the need for additional fixings or adapters that could add complexity and cost to the assembly. An effect may be that this straightforward and efficient design allows for rapid and reliable installation, reducing production time and costs while maintaining optimal acoustic performance. The lack of additional components also minimizes potential sources of vibration or noise, ensuring a high-quality sound output from the magnet arrangement.

The first portion of the light guide may have a clearance fit in the through hole of the magnet arrangement.

A clearance fit may be understood as having a slightly larger opening or aperture than the corresponding dimension of the first portion, allowing for smooth and easy passage. The term "clearance" refers to the small amount of space between the two components.

This arrangement enables easy assembly and disassembly, as well as low stress on materials of light guide and magnet arrangement. By providing a clearance fit, the first portion can be easily inserted into or removed from the through hole without applying excessive force or causing damage to either component. An effect may be that this design allows for rapid and efficient installation, reducing production time and costs while minimizing the risk of material failure due to stress or fatigue. The reduced friction between components also minimizes potential sources of vibration or noise, ensuring a high-quality sound output.

According to various examples, the interference fit of the at least one second protrusion within the through hole of the magnet arrangement is a press fit which may be assembled with cold pressing. In particular, the interference fit may be a press fit which can be assembled or disassembled without damaging the material of the first portion and the at least one second protrusion.

A press fit may be understood as having two components that are pushed together to create a secure connection without the need for additional fasteners or adhesives. The term "cold pressing" refers to the process of assembling the components at room temperature, without applying heat or other external forces.

This press fitting enables easy assembly and disassembly without damaging the components, making it repairable, and results in low stress on materials of light guide and magnet arrangement. By using a press fit that can be assembled with cold pressing, the components are not subjected to high temperatures or stresses that could cause damage or degradation. An effect may be that this design allows for rapid and efficient installation, reducing production time and costs while minimizing the risk of material failure due to stress or fatigue. Optical properties of the light guide may not be negatively affected. The ability to easily disassemble and reassemble the components also makes it easier to repair or replace individual parts, extending the lifespan of the magnet assembly.

In an example, the at least one second protrusion of the first portion is made of plastics. The at least one second protrusion may be dimensioned such that the equivalent plastic strain resulting from the interference fit is below a predefined threshold.

The equivalent plastic strain is a scalar measure used in material science and engineering to quantify the cumulative plastic deformation of a material. It is particularly useful in the context of plasticity and hardening models. This measure is derived from the plastic strain tensor and is defined through the time integration of the equivalent plastic strain rate. In simpler terms, it helps in understanding how much a material has permanently deformed under stress, regardless of the direction of the applied forces. This concept is crucial for predicting the behavior of materials under various loading conditions, ensuring safety and reliability in engineering applications.

The predefined threshold may be understood as a specific limit value for the equivalent plastic strain, which in this case may be 0.5, preferably 0.1, and more preferably 0.02.

This arrangement may be achieved by integrally forming the first portion, the second portion, the first protrusion, and the at least one second protrusion. An integral formation process may involve molding or injection-molding all these components together as a single piece, eliminating the need for separate manufacturing steps.

An effect of this arrangement is that it enables cost-effective production of the light guide, easy assembly without damaging the components, and no or minimal impact on the optical performance of the light guide. By dimensioning the second protrusion to keep the equivalent plastic strain below the predefined threshold, the risk of material failure or degradation due to excessive stress is minimized. This design also allows for efficient manufacturing processes, reducing production time and costs while maintaining high-quality standards. The integral formation process further ensures a secure connection between the components, eliminating potential sources of vibration or noise, and avoids transitions that could affect optical performance.

In an example, the at least one second protrusion of the light guide includes at least two second protrusions, preferably three or four second protrusions. These second protrusions may be arranged equally spaced along a circumference of the first portion.

In some examples, the at least one second protrusion may include a plurality of protruding ribs, for example 8 to 20 ribs, extending on a part of the lateral surface of the first portion in parallel to the longitudinal axis, i.e. in a longitudinal direction. The ribs may be arranged equally spaced along a circumference of the first portion. A length of each of the ribs in the longitudinal direction may be one half, one third or one quarter of the length of the first portion. The ribs may be positioned closer to the first protrusion than to the light receiving end surface.

Equally spaced may be understood as having uniform angular distances between each second protrusion. This may enable centric positioning of the light guide within the through hole and provides an even hold. By having multiple second protrusions equally spaced along the circumference, the interference fit is more stable and secure, allowing for precise centering of the light guide within the magnet assembly. An effect of this design is that it minimizes any potential wobbling or movement of the light guide, ensuring a consistent and reliable optical performance.

Additionally, the even hold provided by the multiple second protrusions helps to distribute the stress and pressure of the interference fit more uniformly around the circumference of the first portion. This reduces the risk of material failure or damage due to localized stress concentrations, further enhancing the reliability and durability of the magnet assembly.

According to various examples, the at least one second protrusion of the light guide includes a continuous ridge. This continuous ridge may be arranged along a circumference of the first portion.

A continuous ridge may be understood as a single, uninterrupted feature that extends around the entire circumference of the first portion, providing a consistent and uniform surface for interference fitting.

This arrangement enables centric positioning of the light guide, provides an even hold, and exerts a uniform influence on the optical guidance. By having a single, continuous feature extending around the circumference, the interference fit is more stable and secure, allowing for precise centering of the light guide within the magnet assembly. An effect of this design is that it minimizes any potential wobbling or movement of the light guide, ensuring a consistent and reliable optical performance.

Furthermore, the uniform influence exerted by the continuous ridge on the optical guidance reduces any potential variations in the optical path. This results in improved optical quality and reduced aberrations, as the light is guided through the assembly with minimal distortion. The even hold provided by this arrangement also helps to distribute the stress and pressure of the interference fit more uniformly around the circumference of the first portion, further enhancing the reliability and durability of the magnet assembly.

In an example, the magnet assembly may have a notch in an inner surface of the through hole of the magnet arrangement. The notch may extend along an inner circumference of the through hole. The at least one second protrusion may be arranged to snap into this notch when the light guide is located in the through hole.

A notch may be understood as a recessed area or depression in the inner surface of the through hole, specifically designed to receive and engage with the second protrusion. The notch may extend along an inner circumference of the through hole. The term "snap" refers to a mechanism by which the second protrusion is received into the notch, providing a secure and precise fit.

This arrangement enables precise alignment and fastening of the light guide in the magnet arrangement. By holding the light guide at two spaced locations—the edge of the magnet arrangement and the notch in the magnet arrangement—an effect of this design is that it provides a robust and reliable mechanical connection between the light guide and the magnet arrangement. The use of the notch and snap mechanism also facilitates easy and rapid assembly, as the second protrusion can be easily received into the notch without requiring additional tools or fasteners. The resulting secure fit ensures accurate positioning and retention of the light guide within the magnet arrangement, even under varying environmental conditions. This in turn enables reliable optical performance and minimizes potential misalignment or movement of the light guide during operation.

The first protrusion of the light guide may form a stop. This stop may prohibit a further movement of the first portion into the through hole when the first protrusion abuts against the edge of the through hole.

A stop may be understood as a physical barrier or limitation that prevents additional movement of the first portion beyond a certain point, in this case, when the first protrusion contacts the edge of the through hole. The stop can be designed as a step in diameter where the end of the first portion transitions into the second portion. The term "abuts" refers to the direct contact between the first protrusion and the edge of the through hole, providing a clear and defined stop point.

This arrangement enables precise alignment of the light guide with respect to the magnet arrangement. By forming a physical stop that limits further movement, an effect of this design is that it ensures accurate positioning and retention of the light guide within the magnet arrangement. This in turn allows for reliable optical performance, as the light guide is consistently held at the correct position relative to the magnet arrangement.

The use of a physical stop also eliminates potential variability or play in the positioning of the light guide, ensuring consistent results even under varying environmental conditions. By providing a clear and defined stopping point, this design enables precise control over the alignment of the light guide, which is critical for assembly and maintaining optimal optical performance.

The at least one second protrusion of the first portion of the light guide may include two or more second protrusions. These two or more second protrusions may be arranged at different distances from the light receiving end surface.

The term "at different distances" refers to the spatial distribution of the second protrusions along the length of the first portion and thus within the through hole, providing multiple points of contact. This arrangement enables accurate guidance of the light guide within the magnet arrangement. By distributing the interference fit over more positions, an effect of this design is that it provides a secure and stable connection between the light guide and the magnet arrangement. This in turn allows for reliable optical performance, as the light guide is consistently held at the correct position relative to the magnet arrangement. The use of multiple second protrusions also enables precise control over the alignment of the light guide, which is critical for maintaining optimal optical performance. By providing multiple points of contact, this design reduces potential variability or play in the positioning of the light guide, ensuring consistent results even under varying environmental conditions. In addition, noise from vibration and movement may be eliminated.

One example of the present disclosure relates to an audio speaker. The audio speaker comprises a voice coil and a magnet assembly positioned within the voice coil. The magnet assembly may be any one of the above examples. A movable diaphragm is connected to the voice coil and configured to move together with the voice coil. The movable diaphragm comprises, in a direction opposite the main sound emission direction, a front surface and a rear surface opposite the front surface. A light source is configured to emit light, located at the light receiving end surface of the light guide. The second portion of the light guide extends in the main sound emission direction through the diaphragm.

The voice coil may be understood as an electrical conductor that converts electrical energy into mechanical energy. The movable diaphragm is a component that vibrates to produce sound waves. The front and rear surfaces of the diaphragm are opposite each other. The light source is a device that emits light, such as an LED or laser. The light guide is a structure that directs the light from the light source to the front surface of the diaphragm.

An effect of this arrangement may be that the audio speaker provides space-efficient mounting of the magnet assembly including the light guide within the voice coil, without requiring additional fixation means like screws or adhesives for the light guide. This allows for exact positioning and easy assembly and disassembly of the components. Additionally, the homogenous illumination of the diaphragm by the light guide can enhance the visual appearance of the audio speaker. The use of a light guide to direct light through the magnet arrangement to the diaphragm can also create a visually appealing effect, such as creating patterns or images on the surface of the diaphragm.

Referring to FIG. 1, an audio speaker 100 is provided which includes a speaker unit 102, a light guide 104, a light source 106 provided on a circuit board 108 and a protective cap 110 (sometimes also referred to as dust cap) connected to a center part of a diaphragm 112. The circuit board 108 is connected to the speaker unit 102, e.g. by using a fixing element 114 such as a double-sided adhesive tape. As will be explained below, light generated by the light source 106 will pass through the light guide 104 in order to illuminate a front surface 116 of the diaphragm 112.

In the present context, the term 'light source' should be interpreted to mean a device that is configured to generate light, i.e., electromagnetic waves, preferably within a wavelength range which is visible to a human eye. However, it is not ruled out that the light source is capable of generating electromagnetic waves at wavelengths outside the visible range, such as infrared and/or ultraviolet light. The light source could, e.g., be or include one or more Light Emitting Diodes (LEDs), a laser, a Laser Activated Remote Phosphor (LARP) light source, and/or any other suitable kind of light source.

In the present context, the 'light guide' 104 should be interpreted to mean a component or element that is configured to guide light from one position to another. The light guide 104 could, e.g., be or include a waveguide, an optical fiber with a core and a cladding layer, one or more reflective elements, one or more refractive elements, and/or any other suitable optical elements. For example, the light guide 104 may be made of a plastic material, for example Polymethyl methacrylate (PMMA), Polymethacrylmethylimide (PMMI, e.g. TT50) or Polycarbonate (PC).

The light guide 104 is arranged to guide light emitted from the light source 106 to the front surface 116 of the diaphragm 112. As will be explained in further detail below, the light source 106 is positioned a distance away from the movable diaphragm 112, and thereby also a distance away from a location where the light exits the light guide 104 and is directed to the front surface 116 of the audio speaker 100. Thus, the light guide 104 interconnects the light source 106 and front surface 116 of the diaphragm 112 so that the light emitted from the light source 106 enters the light guide 104 through a light receiving surface of the light guide 104 and is guided, by the light guide 104, from the position of the light source 106 to a light emitting surface of the light guide 104 near the movable diaphragm 112. This allows light to be emitted from the audio speaker 100 at a position at or near the movable diaphragm 112 without requiring the light source to be positioned at or near the movable diaphragm 112. Instead, the light source 106 is located at a position where it is not exposed to heat generated by a voice coil 118 used to control the movement of the diaphragm 112, or other heat generating components of the audio speaker 100, and the detrimental effects on an expected lifetime of the light source 106 caused by such a heat exposure can be reduced or avoided.

The audio speaker 100 emits sound in a main sound emission direction 120, which is indicated by an arrow in FIG. 1. In FIG. 1, the space into which the sound is mainly emitted is the space in front of the audio speaker 100, and a user looking at the audio speaker 100 in a direction opposite to the main sound emission direction 120 looks at the front surface of the audio speaker 100, particularly at the front or upper surface 116 of the diaphragm 112 of the audio speaker 100. The speaker unit 102 includes the movable diaphragm 112, which is connected to a frame 122 via a flexible surround 124 that allows the diaphragm 112 to move perpendicular to a main or center axis 136 and in the direction of the main sound emission direction 120. The speaker unit 102 further comprises a drive unit configured to generate a magnetic field in which the voice coil 118 is positioned and moved in the direction of the center axis 136. The drive unit may include, for example, a permanent magnet 126, a core cap 128, and a shell pot 130. The core cap 128 and the shell pot 130 may act as pole pieces for guiding the magnetic field of the permanent magnet 126. The drive unit comprising the magnet 126, the core cap 128 and the shell pot 130 will also be referred to as the magnet arrangement 132 hereinafter. A bracket 134 may be provided that covers the circuit board 108 and part of the magnet arrangement 132. The bracket 134 may also assist in mounting the circuit board 108 to the speaker unit 102, such as to the shell pot 130.

As can be deduced from FIG. 1, the circuit board 108 such as a printed circuit board is connected to a lower part of the magnet arrangement 132, and the light source 106 is connected to the circuit board 108 emitting light in direction of the main sound emission direction 120. A part of the light guide 104 is positioned in a through hole 142 of the magnet arrangement 132. Thus, the light guide 104 extends from a lower or rear end of the magnet arrangement 132 to and beyond an upper or front end of the magnet arrangement 132. The light guide 104 collects the light emitted by the light source 106 via a light receiving end surface and guides the light from a rear part of the audio speaker 100 to a front part of the audio speaker 100 where the light exits the light guide 104 in order to illuminate the upper or front surface 116 of the diaphragm 112.

Herein, the positions of the different elements present in the audio speaker 100 are described relative to the main sound emission direction 120. Accordingly, the circuit board 108 and the light source 106 are connected to a lower or rear part of the magnet arrangement 132. Looking on the speaker 100 in a direction opposite the main sound emission direction 120, the diaphragm 112 includes the upper surface 116 and a lower surface 146. The upper surface 116 is the front surface facing the space above or in front of the audio speaker 100 to which the sound is emitted, wherein the rear surface 146 is opposite the front surface 116 and faces an interior of the audio speaker 100 and is usually not visible from the outside for a user looking at the audio speaker from the front side. The permanent magnet 126 provides a static magnetic field with field lines passing through the core cap 128 and the shell pot 130, and a cylindrical air gap is formed between the core cap 128 and the shell pot 130 where a homogeneous magnetic field is provided. The voice coil 118 is arranged in the air gap so that changes in a varying magnetic field induced by the voice coil 118 when a varying current is applied to the windings of the voice coil 118 cause the voice coil 118 to move in an axial direction, i.e. parallel to the center axis 136. The voice coil 118 is connected to the movable diaphragm 112 via a support 138 and is therefore arranged to move together with the diaphragm 112 in order to generate and emit the acoustic waves from the audio speaker 100.

When current is applied to the voice coil 118, the voice coil 118 moves together with the diaphragm 112 parallel to the center axis 136, the movement being further guided by a centering element, also referred to as a spider 140. The diaphragm 112 may be a conical diaphragm and is connected at its central portion to the protective cap 110, which closes the audio speaker 100 towards the front surface. The diaphragm 112 has a central opening that is closed by the cap 110, and when the diaphragm is moved, the cap 110 moves together with the diaphragm 112.

The light guide 104 is fixedly attached to the magnet arrangement 132, as described in more detail below. The combination of the magnet arrangement 132 and the light guide 104 is also referred to hereinafter as magnet assembly 144.

Figure 2:
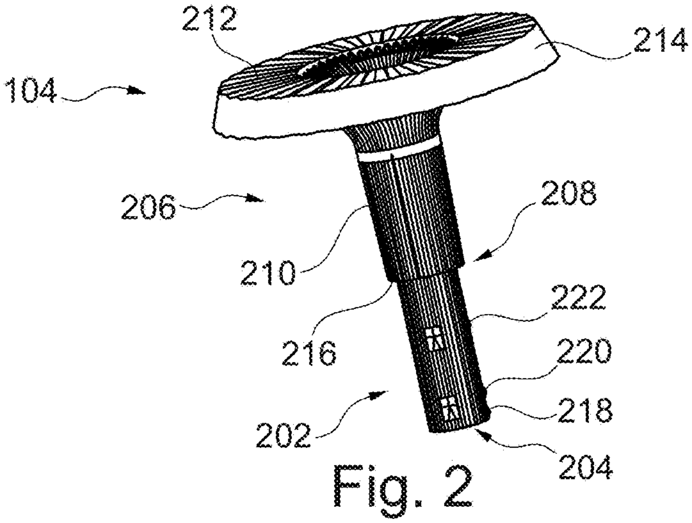
FIG. 2 schematically shows an isometric view of a light guide according to one of a number of embodiments.
Figure 3:
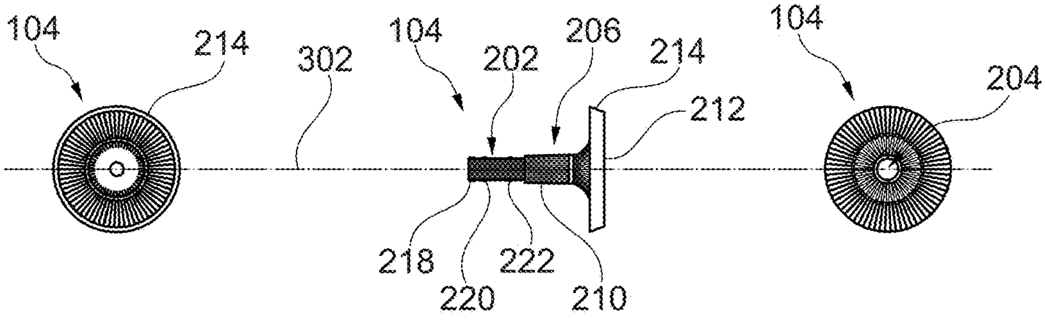
FIG. 3 shows schematic plan views of a light guide according to one of a number of embodiments.

FIG. 2 and FIG. 3 schematically show the light guide 104. FIG. 2 schematically shows an isometric view of the light guide 104, and FIG. 3 illustrates, in the center, a plan view of the light guide 104 along a longitudinal axis 302, on the left, a plan view of the light guide 104 as seen from the front side, and on the right, a plan view of the light guide 104 as seen from the rear side. As illustrated, the light guide 104 includes a first portion 202 having a cylindrical shape with the longitudinal axis 302. In an assembled state of the magnet assembly 144, the longitudinal axis 302 may be aligned to the center axis 136. The first portion 202 has a light receiving end surface 204 for receiving light from the light source 106. The first portion 202 is configured to be inserted in the direction opposite to the main sound emission direction 120 into the through hole 142 of the magnet arrangement 132. The light guide 104 includes a second portion 206 for emitting the light received at the light receiving end surface 204. The second portion 206 is arranged at an end 208 of the first portion 202 opposite to the light receiving end surface 204. The second portion 206 may comprise a conical portion 210 arranged along the longitudinal axis 302 having a diameter that increases in a direction away from the first portion 202. At an end of the conical portion 210 opposite the first portion 202, the second portion 206 may have a disc-shaped portion 212. The disc-shaped portion 212 may be arranged coaxially with the longitudinal axis 302. A lateral circumferential surface 214 of the disc-shaped portion 212 may be oblique with respect to the longitudinal axis 302 by an angle of at least 10°, preferably 25°.

The light guide 104 includes a first protrusion 216 protruding perpendicular to the longitudinal axis 302 from the lateral surface of the first portion 202. The first protrusion 216 provides a support structure for an edge of the through hole 142 when the light guide 104 is located in the through hole, i.e. the first protrusion 216 may abut against a front edge of the through hole 142 thus stopping a movement of the light guide 104 in the rear direction. In the example shown in FIGS. 2 and 3, the first protrusion 216 is formed by the transition between the first portion 202 and the second portion 206 in that the lower end of the second portion 206 has a larger diameter than an upper end of the first portion 202 such that a circumferential protrusion is formed. In other examples, the first protrusion 216 may be formed in other ways, for example by a plurality of separate protrusions that are equally spaced along the circumference of the upper end of the first portion 202.

The light guide 104 also includes at least one second protrusion protruding perpendicular to the longitudinal axis 302 from the lateral surface of the first portion 202. The at least one second protrusion is arranged, in the direction of the longitudinal axis 302, between the first protrusion 216 and the light receiving end surface 204. The at least one second protrusion is dimensioned to provide an interference fit of the first portion 202 within the through hole 142 of the magnet arrangement 132. In the example illustrated in FIG. 2, the light guide 104 has twelve second protrusions. Of the twelve second protrusions, each four second protrusions are provided equidistantly along the circumference of the first portion at the same distance from the light receiving end surface 204. In other words, the twelfth second protrusions may be arranged in groups of four at three levels along the length of the first portion 202. For example, a length of the first portion 202 along the longitudinal axis 302 may be in a range of, for example, 8 to 20 mm, such as 10 mm. In this example, a first group of four second protrusions 218 may be provided in an equidistant arrangement along the circumference of the first portion 202 close to the light receiving end surface 204, i.e. essentially at the lower end of the first portion 202. A second group of four second protrusions 220 may be provided in an equidistant arrangement along the circumference of the first portion 202 at a short distance from the light receiving end surface 204, for example, at a distance of 2 to 5 mm, such as 2 mm. A third group of four second protrusions 222 may be provided in an equidistant arrangement along the circumference of the first portion 202 at a larger distance from the light receiving end surface 204, for example, at a distance of 5 mm to 10 mm, such as 5 mm.

However, the above-described arrangement of the second protrusions is only an example. In other examples, another number of groups of second protrusions, for example only one group or two groups or more than three groups may be provided at a corresponding number of distances along the length of the first portion 202. The number of second protrusions in each group may be varied, i.e. one group may comprise only two second protrusions whereas another group may comprise more than four second protrusions, for example three, six or eight second protrusions. In other examples, the second protrusion may be formed as a continuous ridge arranged along the circumference of the first portion 202 at a specific distance from the light receiving end surface 204. A plurality of continuous circumferential ridges may be arranged at different distances from the light receiving end surface 204. In other examples, the second protrusion may be formed as one or more continuous ridges arranged along the length of the first portion 202 or at least a part of the length of the first portion 202.

Figure 4:
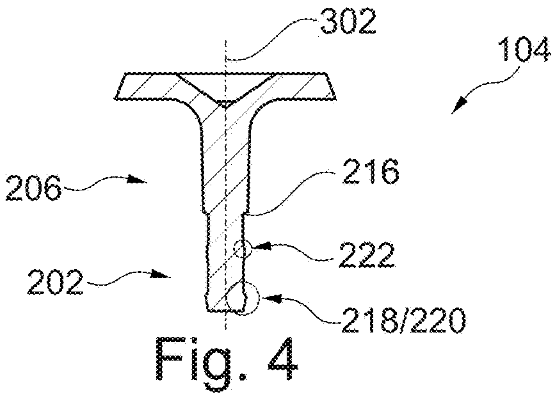
FIG. 4 shows a schematic cross-sectional view of a light guide according to one of a number of embodiments.

FIG. 4 shows a cross-sectional view of the light guide 104 along the longitudinal axis 302 in more detail. The first protrusion 216 is formed by the transition between the first portion 202 and the second portion 206. In the following, as an example, it is assumed that the diameter of the through hole 142 of the magnet arrangement 132 is 4.1 mm. However, this is only an example and other sizes with similar relations to each other may be used in larger or smaller applications.

Figure 5:
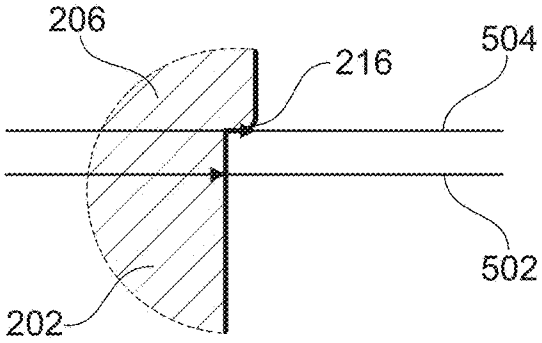
FIG. 5 shows a schematic partial cross-sectional view of a detail of the light guide of FIG. 4.

The first protrusion 216 is illustrated in FIG. 5 in more detail. The cylindrical first portion 202 may have an outer diameter 502 of 4.09 mm so that the first portion 202 has some clearance within the through hole 142. The lower end of the second portion 206 may have an outer diameter 504 in a range of 5 to 6 mm, such as 5 mm. when the light guide 104 is inserted into the through hole 142 from the front side, the first portion 202 can be pushed through the through hole 142 until the first protrusion 216 abuts at the front edge of the magnet arrangement 132, in particular at the front edge of the core cap 128. Thus, the position of the light guide 104 along the center axis 136 with respect to the magnet arrangement 132 is determined.

The second protrusions 222 of the third group may be positioned such that they extent in a notch in the inner surface of the through hole 142 when the light guide 104 is installed in the through hole 142 with the first protrusion 216 abutting at the front edge of the magnet arrangement 132. The notch in the inner surface of the through hole 142 may be formed by a transition between the permanent magnet 126 and the core cap 128 as can be seen in FIG. 1.

Figure 6:
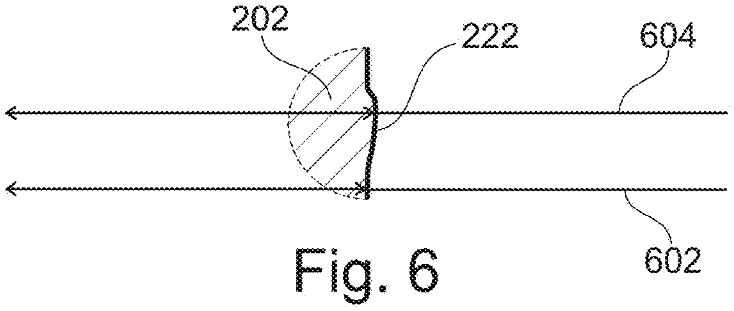
FIG. 6 shows a schematic partial cross-sectional view of a further detail of the light guide of FIG. 4.

A cross-section of one of the second protrusions 222 is shown in greater detail in FIG. 6. As above, the diameter 602 of the cylindrical first portion 202 may be 4.1 mm. The second protrusion 222 extends in a radial direction by, for example, 0.13 mm. As a result, a circumscribed circle around the second protrusions 222 may have a diameter 604 of 4.26 mm, which is larger than the inner diameter of 4.1 mm of the through hole 142. A press fit is achieved between the inner surface of the through hole 142 and the second protrusions 222, which is at least partially relieved by the notch in the inner surface of the through hole 142 so that the second protrusions 222 snap into the assembled position. The length of each of the second protrusions 222 in the longitudinal direction 302 may be in a range of 0.5 to 3 mm, for example 1 mm. The length of each of the second protrusions 222 in the circumferential direction may be in a range of 0.5 to 5 mm, for example 2 mm. The transitions between the cylindrical surface of the first portion 202 and the second protrusions 222 may be tapered. The second protrusions 222 may be dimensioned such that the equivalent plastic strain resulting from the interference fit between the second protrusions 222 and the inner surface of the through-hole 142 is below a predefined threshold in a range of 0.01 to 0.5, such as 0.1. As a result, the second protrusions 222 may be deformed without being damaged when the first portion 202 is inserted into the through-hole 142 such that a press fit can be achieved.

The second protrusions 220 of the second group may be positioned in the direction of the longitudinal axis of 302 between the second protrusions 222 of the third group and the light receiving end surface 204. A cross-section of one of the second protrusions 220 is shown in more detail in FIG. 7. As above, the diameter 702 of the cylindrical first portion 202 may be 4.1 mm. The second protrusion 220 extends in a radial direction by, for example, 0.1 mm. As a result, a circumscribed circle around the second protrusions 220 may have a diameter 704 of 4.2 mm. A press fit between the inner surface of the through hole 142 and the second protrusions 220 is achieved. The length of each of the second protrusions 220 in the longitudinal direction 302 may be in a range of 0.5 to 3 mm, for example 1 mm. The length of each of the second protrusions 220 in the circumferential direction may be in a range of 0.5 to 5 mm, for example 2 mm. Transitions between the cylindrical surface of the first portion 202 and the second protrusions 220 may be tapered. The second protrusions 220 and the first portion 202 may be integrally formed, for example made of plastics, for example PMMA, PMMI or PC. The second protrusions 220 may be dimensioned such that the equivalent plastics strain resulting from the interference fit between the second protrusions 220 and the inner surface of the through hole 142 is below a predefined threshold in a range of 0.01 to 0.5, such as 0.1. As a result, the second protrusions 220 may be deformed without being damaged when the first portion 202 is inserted into the through hole 142 such that a press fit can be achieved.

The second protrusions 218 of the first group may be positioned such that they extent in a radial direction at the lower end of the first portion 202, i.e. near the light receiving end surface 204. See FIG. 4. When the light guide 104 is installed in the through hole 142 with the first protrusion 216 abutting at the front edge of the magnet arrangement 132, the second protrusions 218 may be positioned at the lower edge of the through hole 142, i.e. at the lower end of the shell pod 130 as can be seen in FIG. 1.

Figure 7:
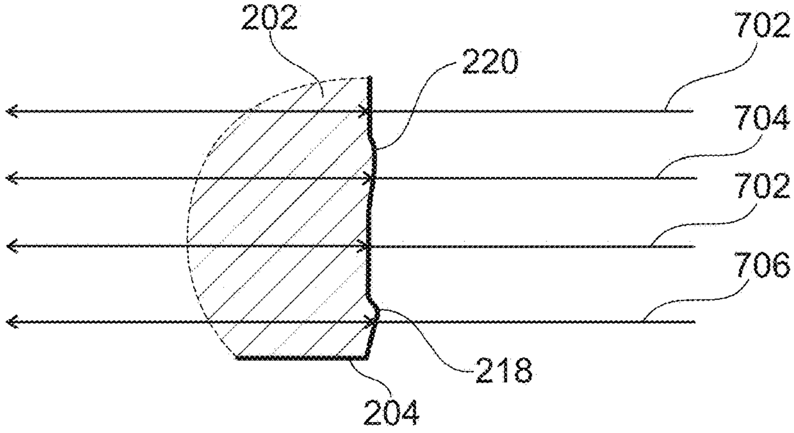
FIG. 7 shows a schematic partial cross-sectional view of a further detail of the light guide of FIG. 4.

A cross-section of one of the second protrusions 218 is shown in more detail in FIG. 7. As above, the diameter 702 of the cylindrical first portion 202 may be 4.1 mm. The second protrusion 218 extends in a radial direction by for example 0.13 mm. As a result, a circumscribed circle around the second protrusions 218 may have a diameter 706 of 4.26 mm. A press fit between the inner surface of the through hole 142 and the second protrusions 218 is achieved, which is at least partially relieved at the lower end of the shell pod 130 such that the second protrusions 218 to snap into the assembled position. The length of each of the second protrusions 218 in the longitudinal direction 302 may be in a range of 0.5 to 3 mm, for example 1 mm. The length of each of the second protrusions 218 in the circumferential direction may be in a range of 0.5 to 5 mm, for example 2 mm. Transitions between the cylindrical surface of the first portion 202 and the second protrusions 218 may be tapered. The second protrusions 218 and the first portion 202 may be integrally formed, for example made of plastics, for example PMMA, PMMI or PC. The second protrusions 218 may be dimensioned such that the equivalent plastics strain resulting from the interference fit between the second protrusions 218 and the inner surface of the through hole 142 is below a predefined threshold in a range of 0.01 to 0.5, such as 0.1. As a result, the second protrusions 218 may be deformed without being damaged when the first portion 202 is inserted into the through hole 142 such that a press fit can be achieved.

Particularly, the interference fit provided by the second protrusions 218, 220 and 222 may be a press fit which can be assembled with cold pressing. In combination with the first protrusion 216, a reliable and secure fixing as well as an accurate positioning of the light guide 104 within the through hole 142 of the magnet arrangement 132 may be achieved, which avoids rattling sounds and does not limit the light guide's efficiency or its ability to effectively mix colors. Moreover, the design is sustainable and can be easily disassembled without damaging the material of the first portion and the at least one second protrusion.

Figure 8:
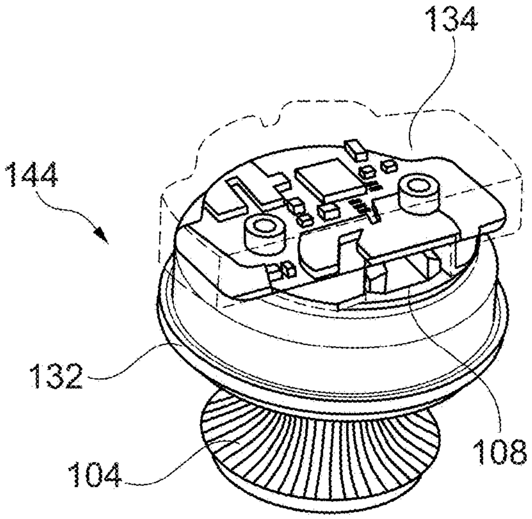
FIG. 8 schematically shows an isometric view of a magnet assembly including a light guide according to one of a number of embodiments.

FIG. 8 shows the magnet assembly 144 in combination with the circuit board 108 and the bracket 134 a perspective view from the rear side. The circuit board 108 is disposed at the rear of the magnet assembly 144. The magnet assembly 144 comprises the magnet arrangement 132 and the light guide 104 in an assembled state, i.e., the first portion 202 of the light guide 104 is inserted into the through hole 142 of the magnet arrangement 132.

Figure 9:
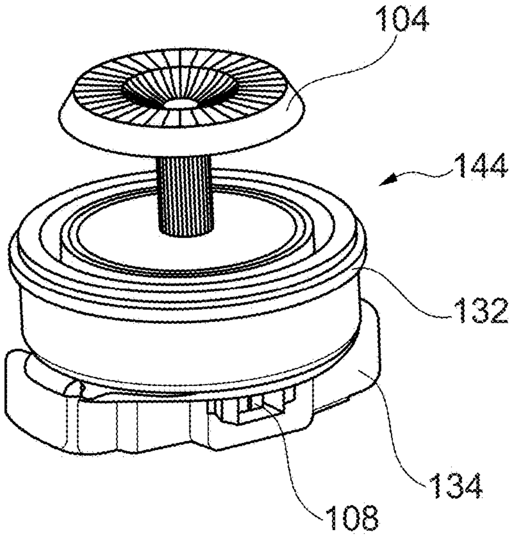
FIG. 9 schematically shows a further isometric view of the magnet assembly of FIG. 8.

FIG. 9 shows the magnet assembly 144 in combination with the circuit board 108 and the bracket 134 in a perspective view from the front side.

Figure 10:
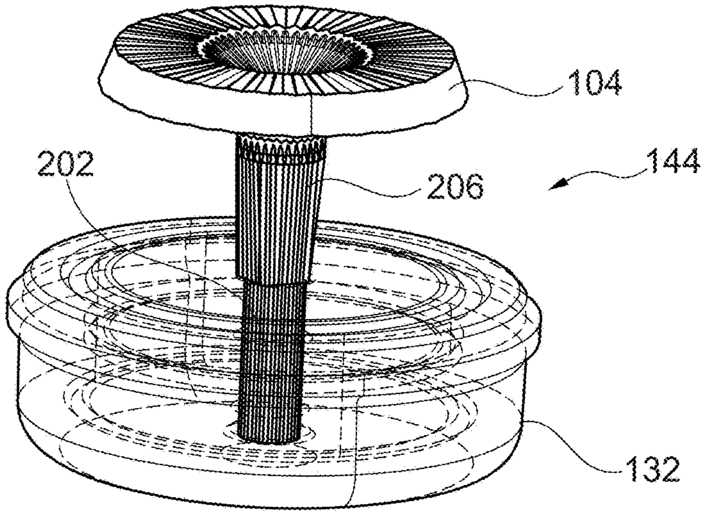
FIG. 10 schematically shows an isometric view of a magnet assembly including a light guide according to one of a number of embodiments.

FIG. 10 shows the magnet assembly 144 comprising the magnet arrangement 132 and the light guide 104 in an assembled state, i.e., the first portion 202 of the light guide 104 is inserted into the through hole 142 of the magnet arrangement 132.

Figure 11:
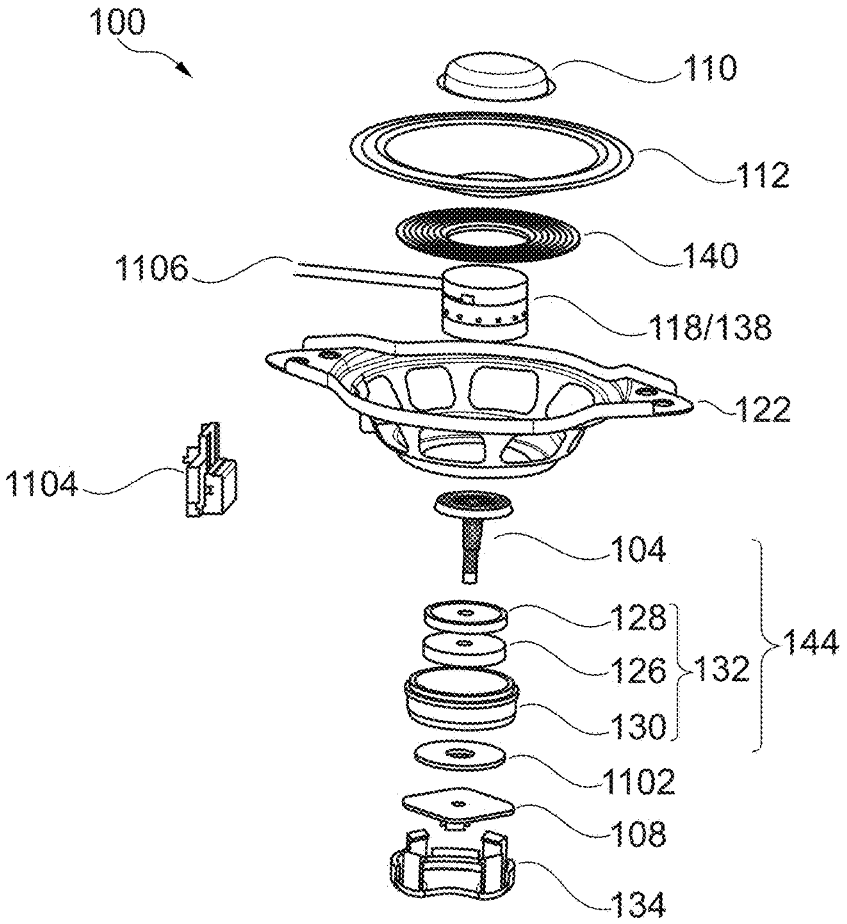
FIG. 11 schematically shows an exploded view of an audio speaker which is illuminated by a light source according to one of a number of embodiments.

FIG. 11 shows an exploded view of the audio speaker 100. From the rear (at the lower side of FIG. 11) to the front (at the upper side of FIG. 11) the audio speaker 100 comprises the bracket 134, the circuit board 108, a tape 1102 and the magnet arrangement 132 comprising the shell pot 130, the magnet 126 and the core cap 128. The printed circuit 108 may comprise at a central position the light source 106 and may be mounted at the shell pot 130 by means of the tape 1102 which may be a double sided adhesive tape. In addition, the bracket 134 may assist in mounting the printed circuit 108 at the shell pot 130.

Furthermore, the audio speaker 100 comprises the light guide 104 which may be inserted into the through hole 142 of the magnet arrangement 132 as described above in connection with FIGS. 4 to 7 thus forming the magnet assembly 144.

The audio speaker 100 furthermore comprises the frame 122, the support 138 in combination with the voice coil 118, the spider 140, the diaphragm 112 and the protective cap 110. The bracket 134 may mount the magnet assembly 144 in combination with the circuit board 108 at the rear side of the frame 122. At a front side of the frame 122, the diaphragm 112 may be mounted via the flexible surround 124. The support 138 may be mounted at the rear side of the diaphragm 112 and positioned such that it can be freely moved along the center axis 136 in the cylindrical gap between the shell pot 130 and the core cap 128. In addition, the spider 140 may elastically connect the support 138 to the frame 122. Connection wires 1106 of the voice coil 118 may be coupled with a connector 1104 which may be mounted at the frame 122 for electrically connecting the voice coil 118 with a sound source, for example an amplifier of a radio or entertainment system. The cap 110 may be coupled to a front surface 116 of the diaphragm 112. The cap 110 moves along with the diaphragm 112 in the direction of the center axis 136.

Figure 12:
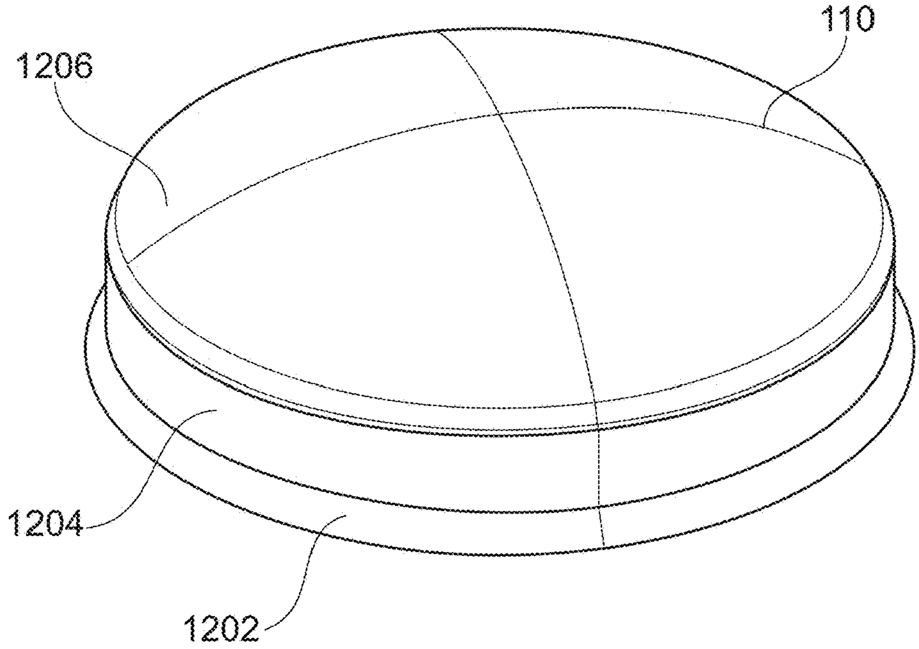
FIG. 12 schematically shows an isometric view of a dust cap for an audio speaker which is illuminated by a light source according to one of a number of embodiments.

FIG. 12 shows a more detailed view of the protective cap 110. The cap 110 includes a connecting portion 1202 by which the cap 110 is connected to the diaphragm 112 and the support 138 of the voice coil 118. The cap 110 furthermore includes a transparent side surface 1204 and a top surface 1206 which includes a material not transparent to the light emitted by the light source 106. The transparent side surface 1204 may be used as window to illuminate the front surface 116 of diaphragm 112.

Figure 13:
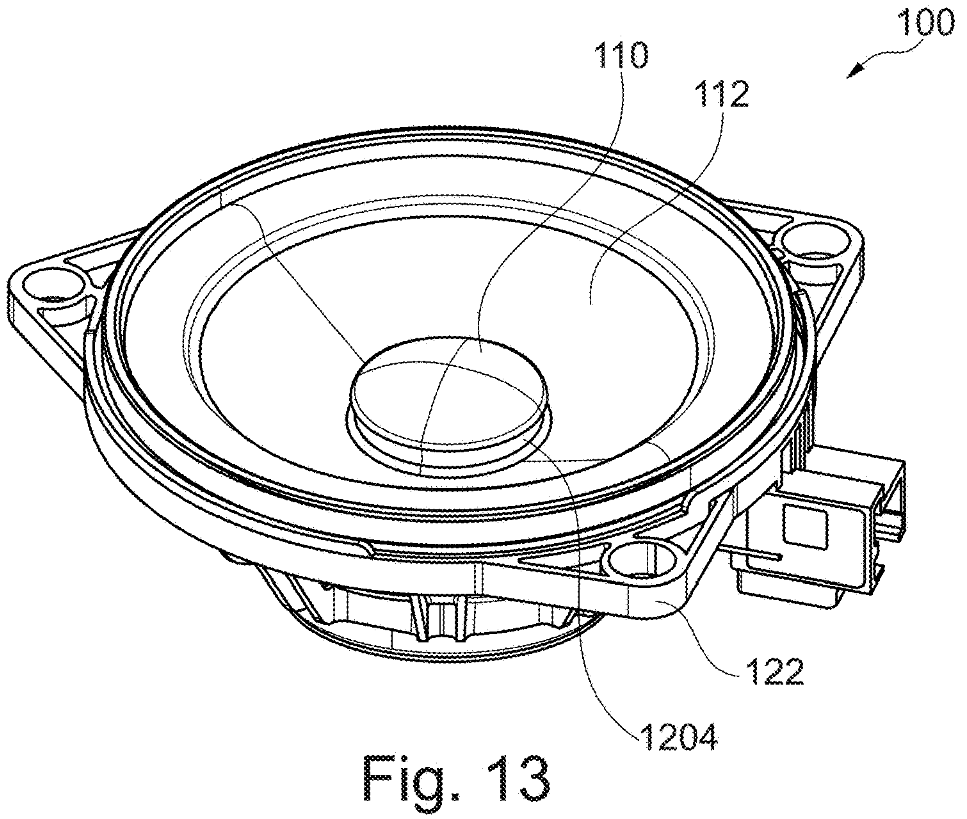
FIG. 13 schematically shows an isometric view of an audio speaker which is illuminated by a light source according to one of a number of embodiments.

FIG. 13 shows a perspective view of the assembled audio speaker 100. As can be seen, the window or transparent side surface 1204 is arranged such that light from the light guide 104 may radially pass the window and illuminate the front surface 116 of the diaphragm 112.

Figure 14:
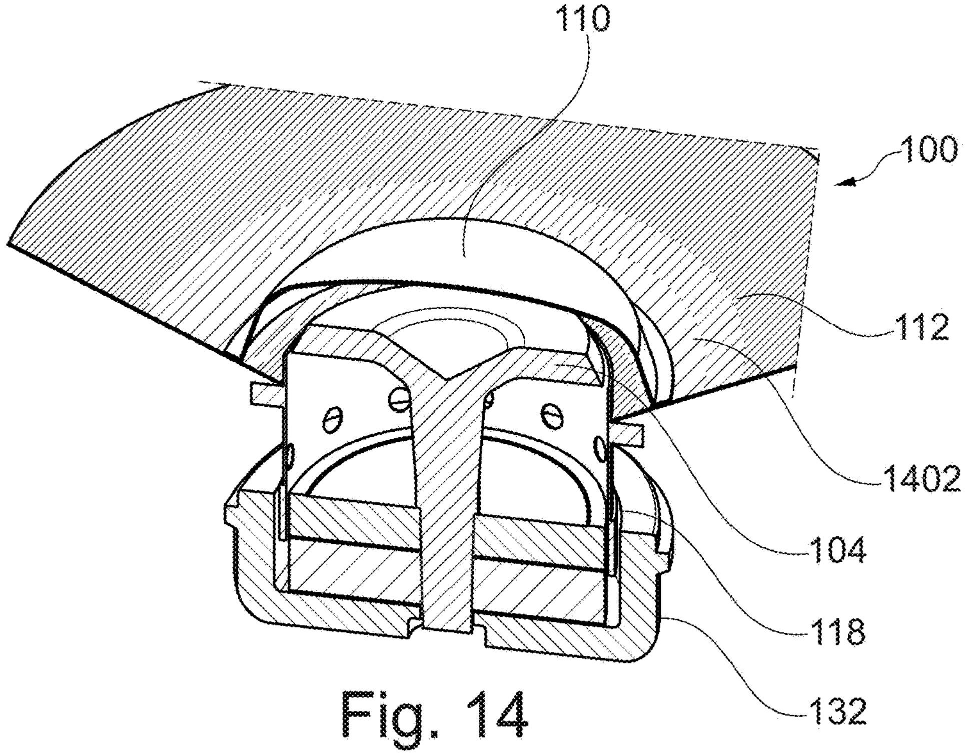
FIG. 14 schematically shows a partially cut isometric view of an audio speaker which is illuminated by a light source according to one of a number of embodiments

FIG. 14 shows a partially cut perspective view of the audio speaker 100. The light guide 104 is partially disposed within and below the cap 110. The light guide 104 is fixed with respect to the frame 122 and the magnet arrangement 132, while the cap 110 with the transparent side surface 1204 moves along with the voice coil 118 in the main sound emitting direction 120. As a result, the amount of light passing through the transparent side surface 1204 varies with the movement of the voice coil 118 and diaphragm 112. In consequence, the amount of light that can pass through the transparent side surface 1204 can be directly proportional to the position of the cap 110 along the center axis 136 relative to the light guide 104. The higher the diaphragm 112 and the cap 110 move in the direction of the main sound emission direction 120, the more light can pass through the transparent side surface 1204, while the more the diaphragm 112 moves in a direction opposite to the main sound emission direction 120, the smaller the amount of light that can pass through the transparent side surface 1204. Thus, the illuminated area 1402 on the front surface 116 of the diaphragm 112 varies.

When the diaphragm 112 moves at lower frequencies, a flash may be visible which follows the movement of the diaphragm 112 as the support 138 of the voice coil 118 moves up in front of the light guide 104. At high frequencies, this may be so fast that no flash is visible, but a continuous illumination is perceived.

The light source 106 can be a light source emitting a single color, such as white light. However, it is also possible that the light source 106 contains different light emitting elements, which emit light of different colors. Here, the light guide 104 may be configured as a color mixing element configured to mix the light such that light of a uniform color exits the light guide 104 at the lateral circumferential surface 214.

The audio speaker 100 may be designed as a cone speaker, where the movable diaphragm 112 has a cone shape.

In FIG. 13, the dust cap 110 is implemented as a bottom dust cap and in FIG. 14, the dust cap 110 is implemented as a flange dust cap. However, these are examples only and other types of dust caps may be used instead, such as an insert dust cap.

Figure 15:
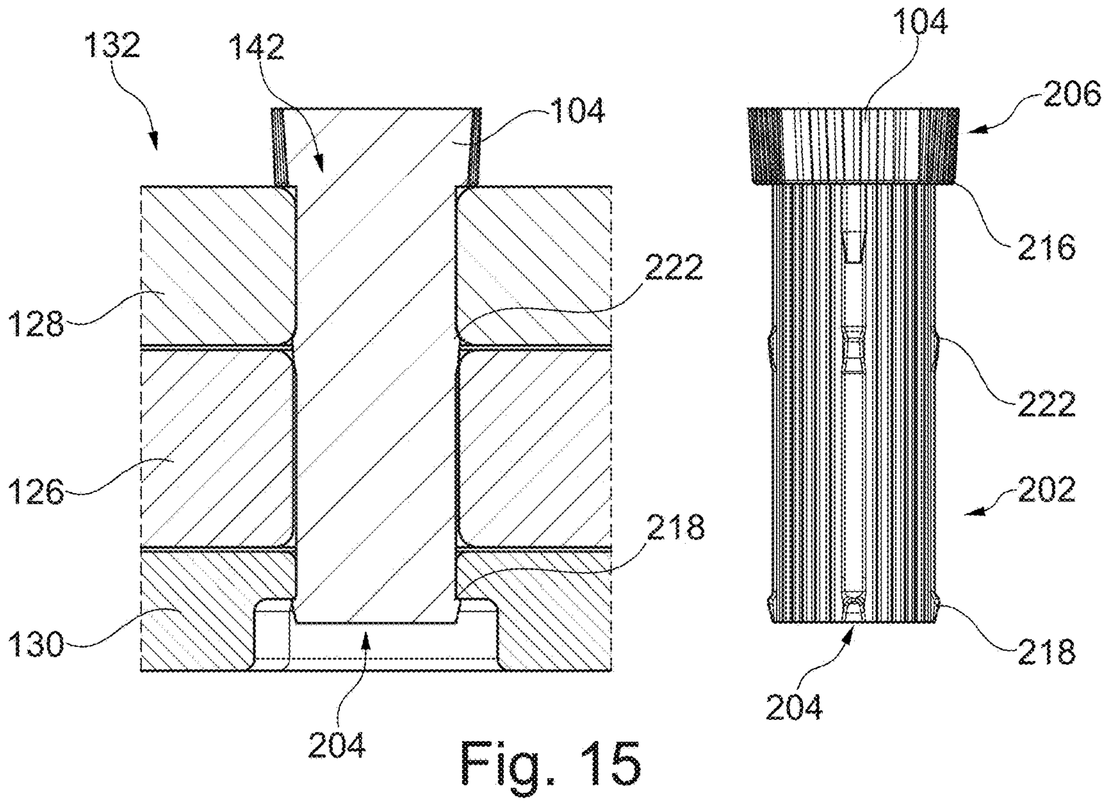
FIG. 15 shows a schematic cross-sectional view of a part of a magnet arrangement and a light guide, and a schematic side view of the light guide according to one of a number of embodiments.

FIG. 15 shows a schematic cross-sectional view of a part of an exemplary magnet arrangement 132 and an exemplary light guide 104 on the left, and a schematic side view of the light guide 104 on the right. The magnet arrangement 132 comprises a core cap 128, a shell pot 130 and a magnet 126 between the core cap 128 and the shell pot 130. A through hole 142 is provided in the magnet arrangement 132 into which the light guide 104 is inserted. As in the example illustrated in FIG. 2, the light guide 104 has a first protrusion 216 at a transition between the first (lower) portion 202 and the second (upper) portion 206. Second protrusions 218 (in this example four second protrusions 218) are disposed at a lower end of the first portion 202, i.e. near the light receiving end surface 204. The second protrusions 218 can engage with a lower edge of the shell pot 130. Further second protrusions 222 (in this example four second protrusions 222) may be positioned such that they extent into a notch in the inner surface of the through hole 142 when the light guide 104 is installed in the through hole 142 with the first protrusion 216 abutting at the front edge of the magnet arrangement 132. The notch in the inner surface of the through hole 142 may be formed by a transition between the magnet 126 and the core cap 128, as seen in FIG. 15. The second protrusions 222 extend in radial directions. As a result, a circumscribed circle around the second protrusions 222 may have a greater diameter than the inner diameter of the through hole 142. A press fit is achieved between the inner surface of the through hole 142 and the second protrusions 222, which is at least partially relieved by the notch in the inner surface of the through hole 142 so that the second protrusions 222 snap into the assembled position.

Figure 16:
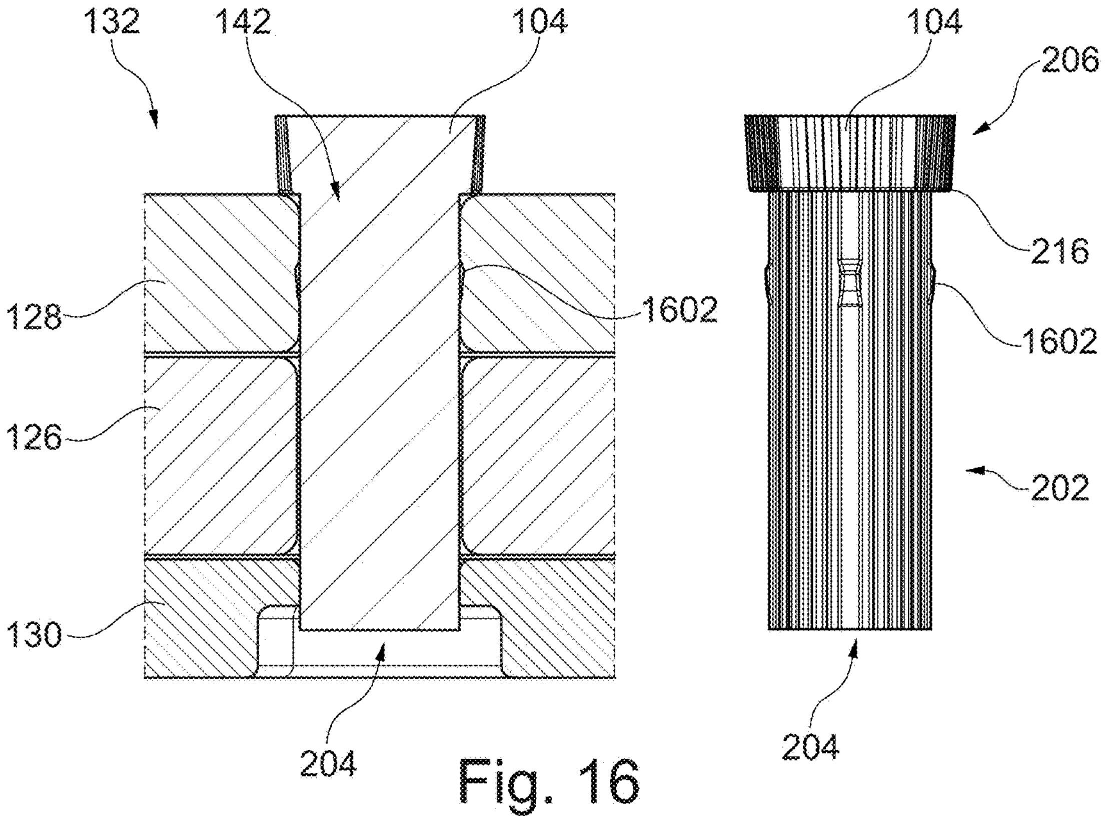
FIG. 16 shows a schematic cross-sectional view of a part of a magnet arrangement and a light guide, and a schematic side view of the light guide according to one of a number of further embodiments.

FIG. 16 shows a schematic cross-sectional view of a part of an exemplary magnet arrangement 132 and a further exemplary light guide 104 on the left, and a schematic side view of the light guide 104 on the right. The magnet arrangement 132 comprises a core cap 128, a shell pot 130 and a magnet 126 between the core cap 128 and the shell pot 130. A through hole 142 is provided in the magnet arrangement 132 into which the light guide 104 is inserted. As in the example illustrated in FIG. 15, the light guide 104 has a first protrusion 216 at a transition between the first (lower) portion 202 and the second (upper) portion 206. The light guide 104 shown in FIG. 16 has second protrusions 1602 (in this example four second protrusions 1602, but any other number of second protrusions is possible, for example in the range of 1 to 20) that are positioned closer to the transition between the first and second portions 202/206 than to the light receiving end surface 204. For example, the second protrusions 1602 may be positioned a few millimeters closer to the first protrusion 216 than the second protrusions 222 shown in FIG. 15, e.g. 2 mm closer. As a result, in the installed position of the light guide 104 in the magnet arrangement 132, the second protrusions 1602 are in press fit contact with the inner surface of the through hole 142 in the core cap 128.

Figure 17:
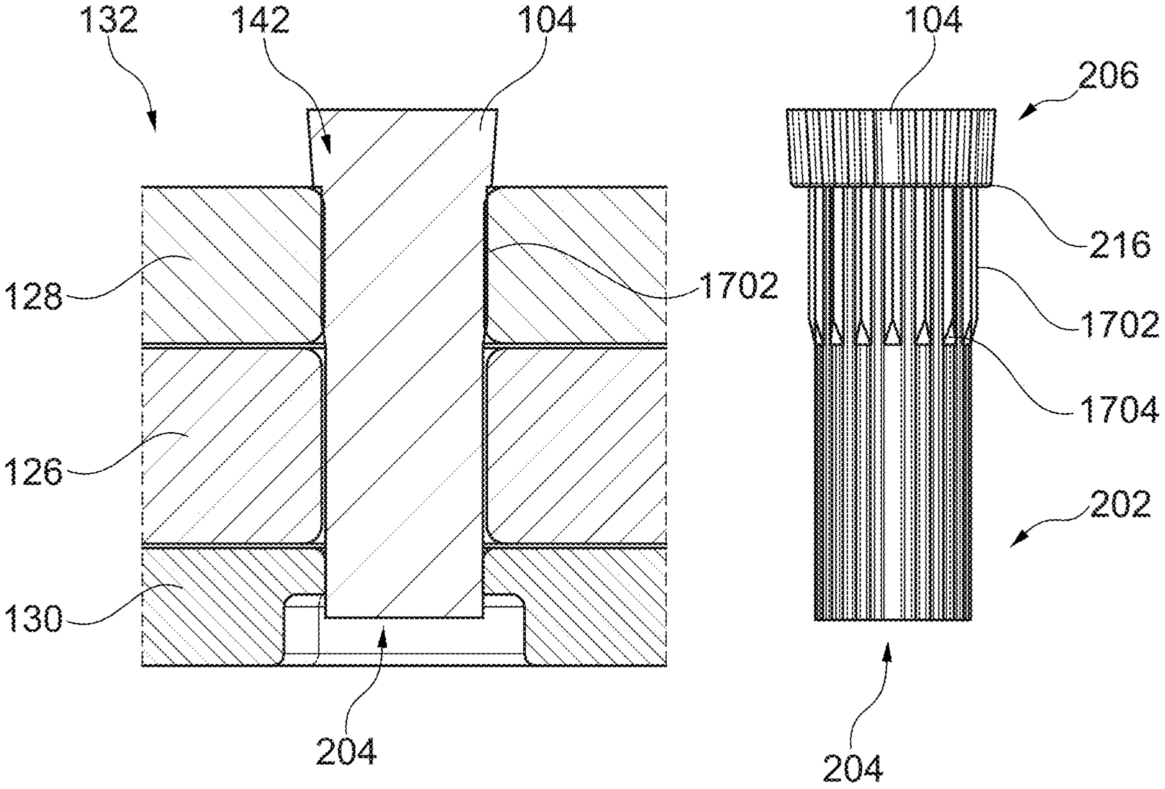
FIG. 17 shows a schematic cross-sectional view of a part of a magnet arrangement and a light guide, and a schematic side view of the light guide according to one of a number of further embodiments.

FIG. 17 shows a schematic cross-sectional view of a part of an exemplary magnet arrangement 132 and a further exemplary light guide 104 on the left, and a schematic side view of the light guide 104 on the right. The magnet arrangement 132 comprises a core cap 128, a shell pot 130 and a magnet 126 between the core cap 128 and the shell pot 130. A through hole 142 is provided in the magnet arrangement 132 into which the light guide 104 is inserted. As in the example illustrated in FIG. 15, the light guide 104 has a first protrusion 216 at a transition between the first (lower) portion 202 and the second (upper) portion 206. The light guide 104 shown in FIG. 17 has second protrusions 1702 formed as ribs extending in a longitudinal direction of the first portion 202. In this example, sixteen ribs 1702 are provided equidistantly along the circumference of the first portion 202, but any other number of ribs is possible, for example in the range of 1 to 50. The ribs are positioned closer to the transition between the first and second portions 202/206 than to the light receiving end surface 204. As illustrated, the ribs 1702 may extend from close to the first protrusion 216 to nearly the middle of the first portion 202. A length of each rib 1702 in the longitudinal direction may be a few millimeters, for example 4 mm. As a result, in the installed position of the light guide 104 in the magnet arrangement 132, the ribs 1702 are in press fit contact with the inner surface of the through hole 142 in the core cap 128. The lower ends 1704 of the ribs 1702 may be chamfered such that the light guide 104 and can be easily inserted into the magnet arrangement 132.

Summarizing the audio speaker 100 discussed above provides an effective way for an illumination of a front surface 116 of the diaphragm 112. The light source 106 is positioned such that the lifetime of the light source 106 is not deteriorated by any heat generated within the audio speaker 100. Furthermore, a compact volume is obtained by simply adding and connecting a circuit board to a lower part of the audio speaker 100 and mounting the light guide 104 by use of press fitting protrusions in the through hole 142 of the magnet arrangement 132.

What is claimed is:

1. A magnet assembly for an audio speaker comprising:

a magnet arrangement including a through hole, and a light guide, wherein the light guide is configured to guide light through the through hole of the magnet arrangement, wherein the light guide includes:

a first portion having a cylindrical shape with a longitudinal axis, wherein the first portion has a light receiving end surface for receiving light from a light source, wherein the first portion is configured to be inserted in a direction of the longitudinal axis into the through hole of the magnet arrangement, a second portion for emitting the light received at the light receiving end surface, wherein the second portion is arranged at an end of the first portion opposite to the light receiving end surface, a first protrusion protruding perpendicular to the longitudinal axis from a lateral surface of the first portion, wherein the first protrusion provides a support structure for an edge of the through hole when the light guide is located in the through hole, and at least one second protrusion protruding perpendicular to the longitudinal axis from the lateral surface of the first portion, wherein the at least one second protrusion is arranged in a direction of the longitudinal axis between the first protrusion and the light receiving end surface, wherein the at least one second protrusion is dimensioned to provide an interference fit of the first portion within the through hole of the magnet arrangement.

2. The magnet assembly of claim 1, wherein the second portion comprises a conical portion arranged along the longitudinal axis and having a diameter that increases in a direction away from the first portion and a disc-shaped portion at an end of the conical portion opposite the first portion.

3. The magnet assembly of claim 2, wherein the first protrusion is formed by an edge of the conical portion facing the end of the first portion.

4. The magnet assembly of claim 1, wherein a cross-section of the first portion perpendicular to the longitudinal axis corresponds to a cross-section of the through hole of the magnet arrangement.

5. The magnet assembly of claim 1, wherein the first portion has a clearance fit in the through hole of the magnet arrangement.

6. The magnet assembly of claim 1, wherein the interference fit is a press fit assembled with cold pressing.

7. The magnet assembly of claim 1, wherein the interference fit is a press fit assembled or disassembled without damaging material of the first portion and the at least one second protrusion.

8. The magnet assembly of claim 1, wherein the first portion and the at least one second protrusion comprise plastic, wherein the at least one second protrusion is dimensioned such that an equivalent plastic strain resulting from the interference fit is below a predefined threshold.

9. The magnet assembly of claim 1, wherein the first portion, the second portion, the first protrusion, and the at least one second protrusion are integrally formed.

10. The magnet assembly of claim 1, wherein the at least one second protrusion comprises at least two second protrusions arranged equally spaced along a circumference of the first portion.

11. The magnet assembly of claim 1, wherein the at least one second protrusion comprises a continuous ridge arranged along a circumference of the first portion.

12. The magnet assembly of claim 1, wherein the magnet arrangement comprises a notch in an inner surface of the through hole, wherein the at least one second protrusion is arranged to snap in the notch when the light guide is located in the through hole.

13. The magnet assembly of claim 1, wherein the first protrusion forms a stop prohibiting a further movement of the first portion into the through hole when the first protrusion abuts against the edge of the through hole.

14. The magnet assembly of claim 1, wherein the at least one second protrusion comprises at least two second protrusions arranged at different distances from the light receiving end surface.

15. An audio speaker configured to emit sound in a main sound emission direction, comprising:

a voice coil;

a magnet assembly positioned within the voice coil, the magnet assembly comprising:

a magnet arrangement including a through hole, and a light guide, wherein the light guide is configured to guide light through the through hole of the magnet arrangement, wherein the light guide includes:

a first portion having a cylindrical shape with a longitudinal axis, wherein the first portion has a light receiving end surface for receiving light from a light source, wherein the first portion is configured to be inserted in a direction of the longitudinal axis into the through hole of the magnet arrangement, a second portion for emitting the light received at the light receiving end surface, wherein the second portion is arranged at an end of the first portion opposite to the light receiving end surface, a first protrusion protruding perpendicular to the longitudinal axis from a lateral surface of the first portion, wherein the first protrusion provides a support structure for an edge of the through hole when the light guide is located in the through hole, and at least one second protrusion protruding perpendicular to the longitudinal axis from the lateral surface of the first portion, wherein the at least one second protrusion is arranged in a direction of the longitudinal axis between the first protrusion and the light receiving end surface, wherein the at least one second protrusion is dimensioned to provide an interference fit of the first portion within the through hole of the magnet arrangement;

a movable diaphragm connected to the voice coil; and the light source configured to emit light, the light source being located at the light receiving end surface of the magnet assembly, wherein the second portion of the light guide extends in the main sound emission direction through the movable diaphragm.

16. The audio speaker of claim 15, wherein the movable diaphragm is configured to move together with the voice coil, the movable diaphragm comprising a front surface and a rear surface opposite the front surface.

17. The audio speaker of claim 16, wherein the movable diaphragm is arranged in a direction opposite to the main sound emission direction.

18. The audio speaker of claim 15, wherein the second portion comprises a conical portion arranged along the longitudinal axis and having a diameter that increases in a direction away from the first portion and a disc-shaped portion at an end of the conical portion opposite the first portion.

19. The audio speaker of claim 15, wherein a cross-section of the first portion perpendicular to the longitudinal axis corresponds to a cross-section of the through hole of the magnet arrangement.

20. The audio speaker of claim 15, wherein the magnet arrangement comprises a notch in an inner surface of the through hole, wherein the at least one second protrusion is arranged to snap in the notch when the light guide is located in the through hole.

* * * * *